Oct. 8, 1935.          F. HARTKE          2,016,998
STRAIGHT WAY COCK
Filed Sept. 15, 1933
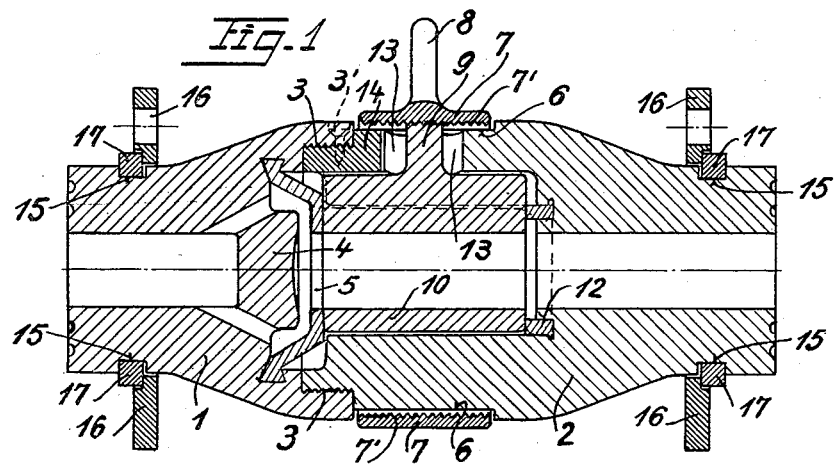
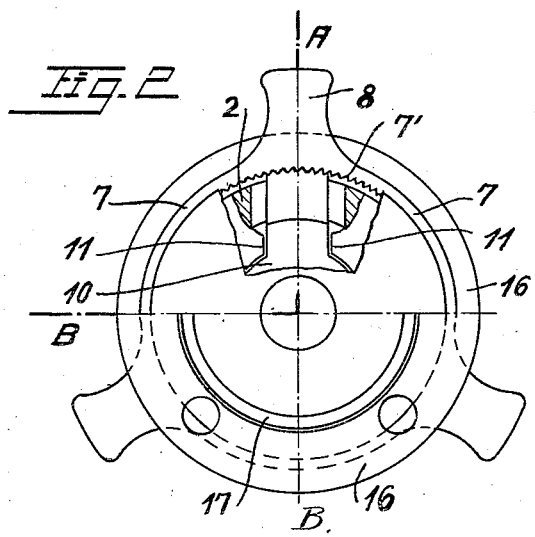
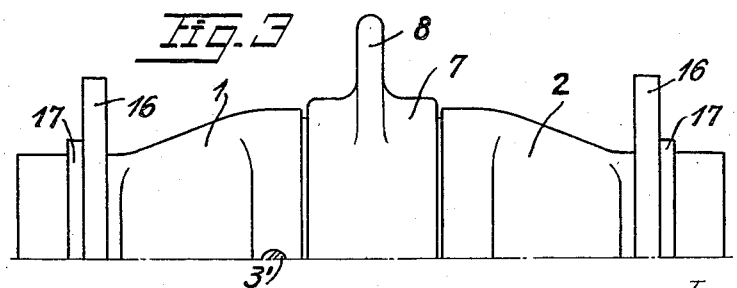
Inventor:—
Fritz Hartke
by his Attorneys
Howson & Howson Patented Oct. 8, 1935

2,016,998

UNITED STATES PATENT OFFICE 2,016,998

STRAIGHT WAY COCK

Fritz Hartke, Berlin-Altglienicke, Germany, assignor to Saureschutz-Gesellschaft m. b. H., Berlin-Altglienicke, Germany Application September 15, 1933, Serial No. 689,672
In Germany August 3, 1933

7 Claims. (Cl. 251—24)

This invention relates to improvements in straight way cocks made of acid proof material and in which the valve disc is controlled by a sleeve arranged in a casing consisting of two parts, the sleeve being moved longitudinally by the intermediary of a rotary nut arranged between the two parts of the casing. With the known construction of such cocks the parts of the casing are secured to one another by steel clamps which perhaps may be destroyed by leaking acids or their gases.

To avoid these drawbacks the two parts of the casing of the new cock are adapted to be screwed together for which purpose a screw thread is cut into each part of the casing. The ring for controlling the positions of the sleeve is put upon the casing which is provided with a corresponding face reduced in diameter. The connection between said ring and the sleeve is formed by arms arranged on the sleeve and guided in corresponding holes of the casing. Said arms being provided with screw threads engaging a corresponding screw thread cut into the inner face of the controlling ring.

In the accompanying drawing:

Fig. 1 is a sectional view taken along line A—B of Fig. 2,

Fig. 2 is an end view partly in section, the upper half part being shown without the flanges and, Fig. 3 is an elevation of the upper half part of Fig. 1.

The casing of the straight-way-cock comprises two parts 1 and 2 adapted to be screwed together by the thread 3 and to be secured against loosening by means of the bolt 3'. The part 1 is provided with the valve seat 4 and the valve disc 5 having a central opening for the passage of the fluid. The rubber disc 5 is manufactured in such a way that its own tension tends to hold the valve in its open position.

Into the casing part 2 a sleeve 10 is inserted abutting with its one end on the valve disc 5 and on a rubber ring 12 with the other end. This ring 12 prevents the fluid from entering the space between the casing and the sleeve 10 which is provided with two or more radially arranged arms 9 and is adapted to be slid longitudinally but is prevented from rotation by means of guides 11 (Fig. 2) arranged on the inner surfaces of the casing part 2. The said arms 9, the outer surfaces of which are provided with screw threads fit into corresponding openings 13 arranged in the wall of the casing part 2. For convenience of assemblage the parts 14 of the casing 2 between the openings 13 and the screw thread 3 are cut off to allow the arms 9 to be inserted into the openings 13. After the insertion of the arms the cut off parts 14 may be replaced.

The outer surface of the part 2 is provided with a face 6 reduced in diameter and adapted to guide a flat ring 7 having cams or handles 8 for convenience of rotation. This ring 7 on its inner surface is provided with a screw thread 10; 7' engaging the corresponding screw threads of the arms 9. If the casing parts 1 and 2 are screwed together, as shown in Fig. 1, the ring 7 movable on the reduced face 6 can be rotated but cannot be slid longitudinally as this movement is restricted by the shoulders formed by the end face of the casing part 1 and by the reduction of the surface of part 2 (Fig. 3). If, therefore, the ring 7 is rotated the sleeve 10 by the intermediary of the arms 9 engaging the screw thread of the ring 10 is moved longitudinally to close the valve by pressing the disc 5 upon the valve seat 4 or to open it when slid in the opposite direction. As the fluid is prevented from entering the space between the casing and the sleeve engaged by the ring 12 on one end face and by the valve disc 5 on the other end face a leakage of fluid is impossible.

To connect the straight-way-cock with the piping the casing parts 1 and 2, respectively, are provided with slots 15 adapted to take up a split ring 17 for the arrangement of a loose flange 16.

In assembling the parts of the straight-way-cock the disc 5 is inserted into the casing part 1 being provided with the flange ring 16. Then the sleeve 10 is put into the casing part 2 after the rubber ring 12 has been put in and the cut off parts 14 have been taken away. Now the cylinder shaped ring 7 is screwed upon the outer surface of the arms 9 until it touches the shoulder of the reduced face 6. After having arranged the flange on the casing part 2 and after having replaced the cut off parts 14 the halves 1 and 2 of the casing are screwed together.

Finally the locking bolt 3' is put in to secure all parts in place. By the rotation of the ring 7 the sleeve 10 will be brought into one of its two end-positions in which the cock is closed or opened.

I claim:

1. In a valve, a casing comprising a pair of threadedly connected parts, a valve seat with valve passages arranged in one part of the casing, an apertured elastic valve disk flexedly mounted adjacent said valve seat so as to close said passages when forcibly moved but adapted to move away from said seat by its elasticity and flexed mounting, and means for moving said disk axially into engagement with said seat.

2. In a valve, a casing comprising a pair of threadedly connected parts, a valve seat with valve passages arranged in one part of the casing, an elastic valve disk flexedly secured to said part adjacent said seat and adapted to move away from said seat by its elasticity and flexed mounting, a sleeve carried by the other part of the casing and arranged to abut said disk, and means carried by said other part for actuating said sleeve to move said disk axially into engagement with said seat.

3. In a valve, a casing comprising a pair of threadedly connected parts, a valve seat with valve passages arranged in one part of the casing, an elastic valve disk secured to said part adjacent said seat and adapted to move away from said seat by its elasticity, a sleeve carried by the other part of the casing and arranged to abut said disk at one end, a resilient ring carried by said other part in abutting relation with the other end of said sleeve, and means carried by said other part for actuating said sleeve to move said disk against said seat.

4. In a valve, a casing, a valve seat with valve passages arranged in said casing, an elastic valve member arranged to close said passages and adapted to move away from said seat by its elasticity, a sleeve abutting said member and having radial arms extending through openings in the casing wall, and a ring surrounding the casing and adapted to actuate said sleeve to move said member against said seat.

5. In a valve, a casing, a valve seat with valve passages arranged in said casing, an elastic valve member arranged to close said passages and adapted to move away from said seat by its elasticity, a valve actuating member abutting said valve member at one side, a resilient ring carried by an end wall of the casing in abutting relation with the other side of said valve-actuating member, and means for moving said valve-actuating member to move said valve member against said seat.

6. In a valve, a casing, a valve seat with valve passages arranged in said casing, an elastic valve member arranged to close said passages and adapted to move away from said seat by its elasticity, a valve-actuating member abutting said valve member at one side, a resilient member in abutting relation with the other side of said valve-actuating member, and means for moving said valve-actuating member to move said valve member against said seat.

7. In a valve, a casing, a valve seat with valve passages arranged in said casing, an elastic valve disk arranged to close said passages and adapted to move away from said seat by its elasticity, a valve-actuating sleeve abutting said valve disk at one side, a resilient disk in abutting relation with the other side of said valve-actuating sleeve, and means for moving said valve-actuating sleeve to move said valve disk against said seat.

FRITZ HARTKE.